T. A. WILLARD.
TUBULAR DIAPHRAGM FOR STORAGE BATTERY ELECTRODES AND PROCESS OF PRODUCING THE SAME.
APPLICATION FILED AUG. 3, 1914.
1,243,369.
Patented Oct. 16, 1917.
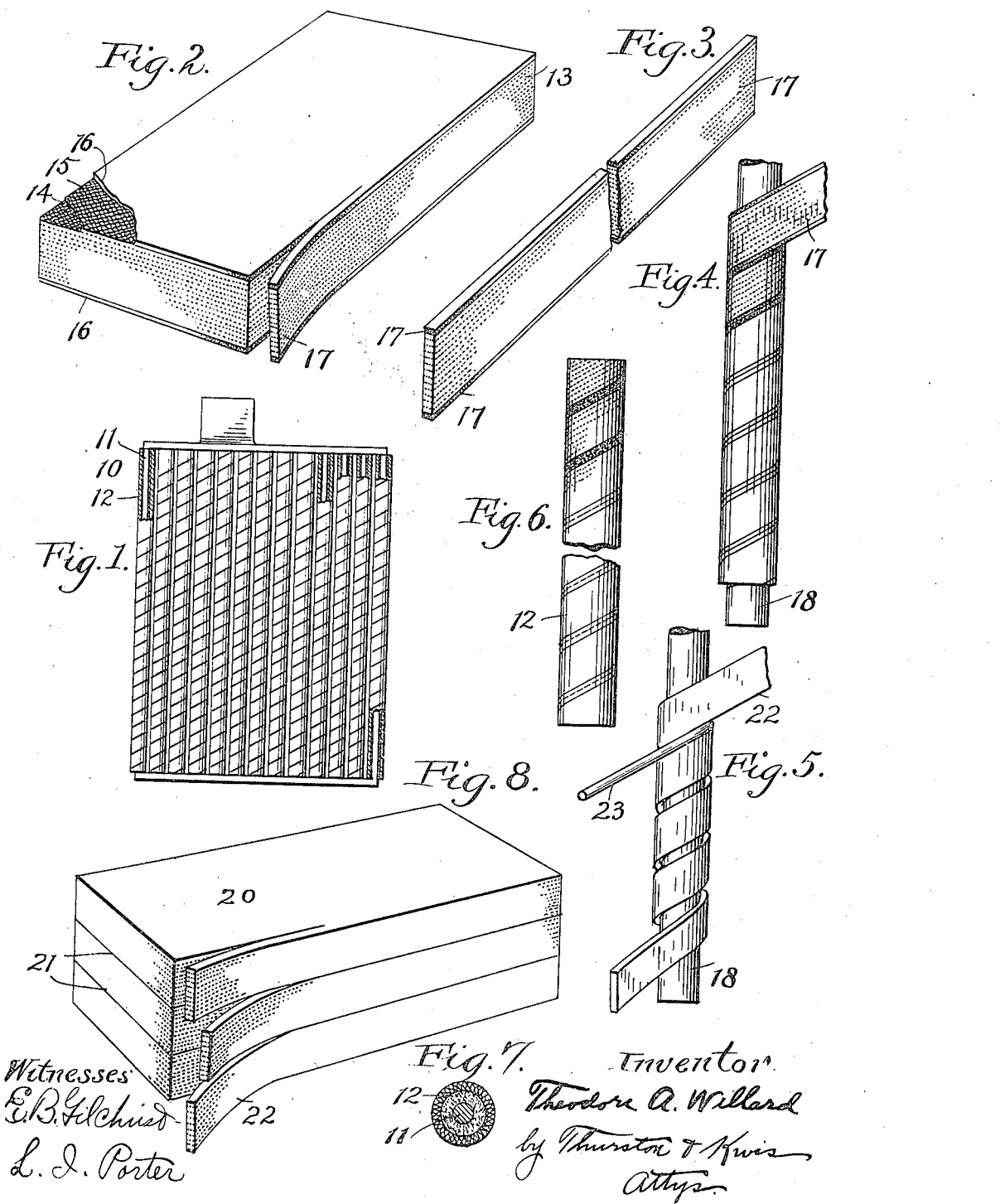

UNITED STATES PATENT OFFICE.

THEODORE A. WILLARD, OF CLEVELAND, OHIO.

TUBULAR DIAPHRAGM FOR STORAGE-BATTERY ELECTRODES AND PROCESS OF PRODUCING THE SAME.

1,243,369.   Specification of Letters Patent.   Patented Oct. 16, 1917.

Application filed August 3, 1914. Serial No. 854,606.

*To all whom it may concern:*

Be it known that I, THEODORE A. WILLARD, a citizen of the United States, residing at Cleveland, in the county of Cuyahoga and State of Ohio, have invented a certain new and useful Improvement in Tubular Diaphragms for Storage-Battery Electrodes and Processes of Producing the Same, of which the following is a full, clear, and exact description.

This invention relates to a tubular diaphragm for storage batteries and to the process of producing the same.

It is customary in the storage battery art to form positive battery plates by providing a grid or frame having parallel upright electrodes, and by inclosing the electrodes in porous tubes and packing the space between the tubes and electrodes with active material. The tubes for the electrodes in a battery plate of this character have been made in numerous ways, but none are satisfactory in all respects. Some have been formed from perforated metal. Others have been formed by molding the same into tubular form, and cutting the tube to form pores, while others have been formed by building up the tube from superimposed washer-like members, the spaces between the washers being intended to provide the pores. The tubes thus formed are unsatisfactory in many respects, among which may be mentioned the difficulty or expense of manufacture, fragility of the completed tubes, and the fact that the pores are not sufficiently small or numerous to produce the best results.

The object of the present invention is to provide a tube or tubular porous diaphragm and to make it in such a way that it overcomes the objections to the prior tubes or processes by which they are produced; more specifically considered, the invention aims to provide a tubular diaphragm which is inexpensive to manufacture, which is strong and durable and one having pores which are very small and numerous, making a porous diaphragm of high conductivity.

In carrying out my invention, I form a tube from a strip preferably by winding the same spirally upon a suitable mandrel, the desirable characteristics of the tube in the way of porosity, rigidity, and ease of manufacture being attributable chiefly to the characteristics of the strip from which the tube is formed, the said strip being preferably formed from rubber or rubber compound, having porous or porosity producing material extending from side to side thereof, the pore producing material being such as to form exceedingly fine and numerous pores substantially uniformly throughout the strip. The manner in which the strip is made will be explained more fully below.

My invention may be further briefly summarized as consisting in certain novel details of construction and steps of the method described in the specification and set forth in the appended claims.

In the accompanying sheet of drawings, Figure 1 is a side view of the battery plate having tubular diaphragms formed in accordance with my invention; Fig. 2 is a perspective view of a composite block or body of material from which the tube-forming strips are made; Fig. 3 is a perspective view of one of the strips severed from the block; Fig. 4 is a view showing the manner in which the tube is formed from the strip; Fig. 5 is a similar view showing a slight modification; Fig. 6 is a view of the completed tube with a portion broken away; Fig. 7 is a cross section through the completed diaphragm and the inclosed electrode; Fig. 8 is a perspective view of the composite block showing a slightly different way of forming the strips from which the tubes are made.

Referring now to the drawings, 10 indicates a battery plate composed of a grid or frame, having upright parallel electrodes 11, each of which is inclosed within a porous tube or tubular diaphragm 12 formed in accordance with my invention, a completed tube being shown on an enlarged scale in Fig. 6.

The very desirable characteristics and high efficiency of the tubes are due very largely to the characteristics of the strip from which the tube is formed. This strip consists of suitable insulating material, such as rubber, having embedded therein substantially uniformly spaced minute and numerous porous or pore producing material extending from side to side of the strip. While this strip may be formed in other than the manner herein described, the best way known to me of producing the same is the following:—

I first form what may be termed a composite block 13, which is built up of a number of superimposed and alternately arranged layers 14 of suitable cementing material, such as rubber and the porosity producing material 15. Rubber or rubber compound, the ingredients of which are so selected that hard rubber may eventually be produced therefrom, is preferably used for the cementing material. For the production of the composite block, this rubber while in a plastic state is rolled into thin sheets, which will be cut to dimensions corresponding to the dimensions of the block which is made up.

For the porosity producing material, I may use porous material, such as coarse woven cloth, threads, fiber, strands of wood, or I may use also soluble material, such as fine wire or metal gauze, which can later be dissolved out of the tube leaving small openings. The insoluble porous material is, however, far more desirable than the last mentioned, and of all the porous materials above mentioned I prefer to use coarse woven cloth known as scrim which is preferably cut on the bias, as illustrated in the lower left hand corner of Fig. 2. This scrim or other porosity producing material will be preferably cut in sheets or strips, having dimensions corresponding to those of the thin sheets of rubber above referred to. After the composite block is built up of the superimposed and alternately arranged sheets of cementing and pore producing material, the block is subjected to pressure so as to cause the sheets of cementing material to thoroughly fill the interstices of the porosity producing material, and to be completely united in the interstices.

When rubber is used, the block will be also vulcanized, at least to such an extent as to produce semi-cured rubber. The pressure and the vulcanizing make the composite block formed as of one body. That is, the rubber is continuous and homogeneous from one face of the block to the other, the individuality of the layers of rubber being entirely lost.

The number of layers, and consequently the height of the block may be varied, as desired. That is, the height may be such as to be equal to the width of the strip to be formed, or the dimensions of the block may be selected independently entirely of the dimensions of the strip which is to be cut from the block. One way of producing very good results is to make the height of the block the same as the width of the tube forming strips, as illustrated in Fig. 2. In this event, I prefer to coat opposite sides of the block with layers of good rubber, these layers being indicated at 16 in Fig. 2.

Next, the block is sawed, sliced or shaved into sections or strips 17, the block being cut at right angles to the embedded layers of the pore producing material, with the result that the strip has extending directly from side to side uniformly spaced and practically uniformly directioned very minute and finely divided pore producing material in the form of strands extending without interruption and directly from one side of the strip to the other. Additionally, there is provided along the longitudinal edges of the strip edging of rubber formed by cutting the outer rubber layers 16. These strips are after being severed from the block flexible, and otherwise in condition to be manipulated or made into tube form.

Next, the strip is made into tubular form by winding the same spirally about a suitable mandrel 18, as shown in Fig. 4. The ends of the tube may be then squared, and the tube is next vulcanized into hard rubber, the contacting edges of the spiral convolutions being thoroughly vulcanized together or integrally united, leaving no openings through which the active material may pass. This forms the finished tube now suitable for use in the battery plate shown in Fig. 1. The tube is highly and uniformly porous, the pores being extremely minute and numerous. It has considerable strength, due partly to the fact that it has not been perforated by perforating instruments, as has been done heretofore with tubes of rubber, and it is not expensive to make.

As before stated, the height of the composite block may be made anything desired, and may be selected independently of the width of the strip. For example, a very large block may be made, and sheets sliced off of the block of a thickness corresponding to the thickness of the strips, and thence the sheet may be cut into sections corresponding in length and width to the length and width of the strips.

In Fig. 8 I have shown substantially this idea, but in this case the block 20 is sliced or slit as at 21 before it is cut into the sections at right angles to the planes of cut 21 to produce the strips 22. In consequence, when the block is cut to form the strips 22, each cut will produce a plurality of strips. These strips will not have the marginal layers of rubber, as in Fig. 3, and therefore to produce good joints between the contacting edges of the spiral convolutions I may in winding the strip leave a space between the convolutions and thence wind on the mandrel in the space a strip or cord of pure rubber 23. In consequence when the tube is subsequently vulcanized into hard rubber because of this cord or strip of rubber thus placed in the spiral space, the edges of the convolutions of the strip will be thoroughly vulcanized, the said united edges forming a continuous strong tube which is imperforate along the line of union of the edges of the convolutions. This tube so formed will have all the desirable characteristics of the tube first described.

Instead of using insoluble porous material for the porosity producing material, I may use material which is not porous in its natural state, such as fine wire or fine wire screen, as before stated. In that event it would be necessary to dissolve out the metal so as to leave minute pores or openings. This can be done by treating the strip or the tube after it is formed from the strip with sulfuric or other acids. This method of producing the pores, however, is not as desirable in many respects as the one first described.

While I have shown my invention in its preferred form, and have specified the preferred methods of producing the same and the preferred materials, nevertheless any other suitable way of carrying out the principle of my invention may be utilized. I, therefore, do not desire to be confined to the exact details or materials or steps of the method herein described, and in the claims I aim to cover all modifications which do not involve departure from the spirit and scope of my invention in its broadest aspects.

Having thus described my invention, what I claim is:—

1. A porous diaphragm for storage batteries, comprising a tube having pore producing material, the elements of which have a general direction from one surface of the tube to the other.

2. A porous diaphragm for storage batteries, comprising a tube having finely divided pore producing material, the elements of which extend substantially directly from one surface of the tube to the other.

3. A porous diaphragm for storage batteries, comprising a tube having pore producing material in finely separated or divided state and substantially uniformly extending from one surface of the tube to the other.

4. A porous diaphragm for storage batteries, comprising a tube comprising cementing material and finely divided pore producing material substantially uniformly distributed and substantially uniformly extending from one surface of the tube to the other.

5. The process of forming a tubular porous diaphragm, which comprises forming into tubular shape a strip having pore producing material extending from side to side thereof, and uniting the adjacent edges of the strip.

6. The process of forming a tubular porous diaphragm, which comprises spirally wrapping about a mandrel a strip of cementing material and pore producing material extending from side to side of the strip, and uniting the edges of the spiral convolutions.

7. The process of forming a porous tube, which comprises winding about a mandrel a strip of rubber and numerous small pore producing elements extending from side to side of the strip, and vulcanizing the tube thus formed.

8. The process of forming a porous tube, which comprises winding into tubular shape a strip of rubber and numerous small pore producing elements extending from side to side of the strip, and vulcanizing together the adjacent edges of the strip.

9. The process of forming a porous tube for storage batteries, which comprises winding spirally about a mandrel a strip of rubber and numerous small pore producing elements, and subjecting the tube thus formed to a process of vulcanization to form hard rubber and to unite the edges of the spiral convolutions.

10. The process of forming a porous diaphragm, which comprises forming a body of cementing material and pore producing material extending through the strip in one main general direction, then slicing or cutting said body to form strips with sections of said pore producing material extending in a general direction from one side of the strip to the other, and then forming said strips into tubular shape and uniting the adjacent edges thereof.

11. The method of forming a porous diaphragm, which comprises forming a block of cementing material and layers of pore producing material, then cutting said block at substantially right angles to the layers to form strips having pore producing material extending from side to side thereof, and then forming said strips into tubular shape and uniting the edges thereof.

12. The method of forming a tubular porous diaphragm, which comprises forming a composite block of cementing material and porosity producing material extending in one general direction through the block, then severing the block at substantially right angles to said direction so as to form strips with sections of the pore producing material extending substantially uniformly from one side thereof to the other, then spirally winding said strip about a mandrel and hardening the tube thus formed and uniting the edges of the spiral convolutions.

13. The process of forming a tubular porous diaphragm, which comprises forming a block of rubber and layers of porous material, cutting the block at substantially right angles to the layers so as to form strips, spirally wrapping the strips about a mandrel and vulcanizing the tube thus formed so as to produce hard rubber and to unite the adjacent edges of the spiral convolutions.

14. A tubular porous diaphragm, having porous material permanently embedded therein and extending from one surface of the tube to the other.

In testimony whereof, I hereunto affix my signature in the presence of two witnesses.

THEODORE A. WILLARD.

Witnesses:
L. I. PORTER,
A. F. KWIS.